United States Patent
Bernsen

(10) Patent No.: US 12,010,243 B2
(45) Date of Patent: Jun. 11, 2024

(54) METHODS AND DEVICES FOR PROVIDING MESSAGE AUTHENTICATION CODE SUITABLE FOR SHORT MESSAGES

(71) Applicant: KONINKLIJKE PHILIPS N.V., Eindhoven (NL)

(72) Inventor: Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 379 days.

(21) Appl. No.: 17/293,200

(22) PCT Filed: Nov. 13, 2019

(86) PCT No.: PCT/EP2019/081084
§ 371 (c)(1),
(2) Date: May 12, 2021

(87) PCT Pub. No.: WO2020/099446
PCT Pub. Date: May 22, 2020

(65) Prior Publication Data
US 2022/0006644 A1    Jan. 6, 2022

(30) Foreign Application Priority Data

Nov. 13, 2018 (EP) .................................... 18205989
Apr. 23, 2019 (EP) .................................... 19170456

(51) Int. Cl.
*H04L 29/06* (2006.01)
*G06F 21/44* (2013.01)
*H04L 9/32* (2006.01)

(52) U.S. Cl.
CPC ............ *H04L 9/3242* (2013.01); *G06F 21/44* (2013.01); *G06F 21/445* (2013.01); *H04L 9/32* (2013.01); *H04L 9/3215* (2013.01)

(58) Field of Classification Search
None
See application file for complete search history.

(56) References Cited

U.S. PATENT DOCUMENTS

2008/0186889 A1* 8/2008 Park ..................... H04W 76/11
370/310
2018/0131522 A1* 5/2018 Lawlis .................. H04L 9/0631

FOREIGN PATENT DOCUMENTS

EP          3264718 A1    1/2018
JP       2012249107 A    12/2012

OTHER PUBLICATIONS

3rd Generation Partnership Project Technical Specification Group Services and System Aspects . . . 3GPP Draft Mobile Compenence Centre vol. TSG SA Mar. 18, 2019.
(Continued)

*Primary Examiner* — Andrew J Steinle

(57) ABSTRACT

This application relates to devices and methods of authenticating messages exchanged over a network between a transmitter and a receiver. The transmitter generates a truncated MAC code by selecting predetermined bits from a message authentication code (MAC) computed over a concatenation of a part of the message with a part of a previously transmitted message. The transmitter appends the truncated MAC code to the message for transmission. The receiver receives a previously transmitted message, the currently transmitted message, and the truncated MAC code, and generates an expected truncated MAC code by selecting predetermined bits from a message authentication code (MAC) computed over a concatenation of the part of the message with the previously transmitted message. The receiver authenticates the message and the previously transmitted message if the truncated MAC code as received is identical to the expected truncated MAC code.

14 Claims, 4 Drawing Sheets

(56) References Cited

OTHER PUBLICATIONS

H.Krawczyk et al "HMAC: Keyed-Hashing for Message Authentication", Feb. 1997.
S. Kelly et al E"Using HMAC-SHA-256, HMAC-SHA-384, and HMAC-SHA-512 with IPsec", May 2007.
3GPP TSG SA WG3 (Security) Meeting #92 ad-hoc.
International Search Report and Written Opinion From PCT/EP2019/081084 dated May 22, 2020.
3rd Generation Partnership Project; Technical Specification Group Radio Access Network; NR; Packet Data Convergence Protocol (PDCP) specification (Release 15); 3GPP TS 38.323 V15.3.0 (Sep. 2018), http://www.3gpp.org/ftp//Specs/archive/38_series/38.323/38323-f30.zip.
3rd Generation Partnership Project; Technical Specification Group Radio Access Network; NR; Radio Resource Control (RRC) protocol specification (Release 15); 3GPP TS 38.331 V15.3.0 (Sep. 2018).
IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), Dec. 2016.
[LoRaWAN] LoRaWAN™ 1.1 Specification, authored by the LoRa Alliance Technical Committee, https://lora-alliance.org/resource-hub/lorawantm-specification-v11 2017.
M. Degermark et al."IP Header Compression", Network Working Group, Feb. 1999, https://datatracker.ietf.org/doc/rfc2507.
K. Sandlund et al."The Robust Header Compression (ROHC) Framework", Internet Engineering Task Force Mar. 2010, https://datatracker.ietf.org/doc/rfc5795/.
Bluetooth Core Specification.

* cited by examiner

METHODS AND DEVICES FOR PROVIDING MESSAGE AUTHENTICATION CODE SUITABLE FOR SHORT MESSAGES

CROSS REFERENCE TO RELATED APPLICATIONS

This application is a U.S. national phase application of International Application No. PCT/EP2019/081084 filed on Nov. 13, 2019, which claims the benefit of EP Application Serial No. 18205989.9 filed on Nov. 13, 2018 and EP Application Serial No. 19170456.8 filed Apr. 23, 2019 and are incorporated herein by reference.

FIELD OF THE INVENTION

The invention relates to methods and device for providing message authentication code suitable for authentication short messages. In particular it relates to transmitter device and method for transmitting a message and a corresponding authentication code and to corresponding receiving device and method for authentication of a received message.

The present invention relates to the field of authentication of message transmitted over a network, such as mobile network, wifi network of bluetooth networks.

BACKGROUND OF THE INVENTION

Internet of things (IoT) device area becoming ubiquous. Many of these devices, e.g. sensor devices, are expected to regularly send messages that are very short, e.g. a 32-bit user or sensor ID, a time stamp of 32 bit and a sensor value of 8 bit. A known issue for all these cheaps devices is the relative weak security associated therewith. One of the relevant security concern is insertion of rogue messages into the network, hence need for the integrity protection of the transmission from such IoT devices. A well-known technique to do this is by adding a Message Authentication Code (MAC) to the message. The input to the MAC computation is a secret key known to sender and receiver and the bits of the message that need to be protected. The output of the MAC computation is n bits that appear to be random. If only one of the bits of the message changes, the output of the MAC computation is radically different in an unpredictable way for somebody not knowing the key. For a good MAC, like for a good cryptographic hash, approximately half of the output bits will change if only one bit in the input is changed. An example class of functions that can be used for the computation of a MAC is the class of HMAC algorithms (keyed-hash message authentication code or hash-based message authentication code, see e.g. [RFC 2104]). An example HMAC is HMAC-SHA256, see [RFC 4868].

The output of HMAC-SHA256 is a 256-bit number. The probability to guess a correct HMAC-SHA256 output when one does not know the key is $2^{-256}$, which is so low that it is in practice impossible to guess correctly. However, having to add 256 bits for the protection of a 72-bit message as in the example above adds a huge overhead to the message.

One can of course reduce the number of bits of the MAC, but then it becomes easier to guess the correct MAC of a message by an attacker, so makes it easier for an attacker to forge messages. Hence, for strong protection, a longer MAC size is desirable.

A potential solution to avoiding the large overhead would be to concatenate several messages together, so enlarging the size of one message, and provide message authentication with a conventionally sized MAC to the concatenated message. However, processing or display at the receiver side of the first measurements which are to be transmitted is delayed. This is not attractive as some transmissions may be time sensitive and waiting for other messages for concatenation may affect the functioning of the system.

SUMMARY OF THE INVENTION

It is an object of the invention to a method for providing message authentication code suitable for short messages which alleviate at least one of the problems above. The object is reached by a method according to claim 1. Basically the solution makes use of the fact that a transmitter (e.g. the IoT device) usually sends more than one message.

When the transmitter (e.g. the IoT device) sends a message, most or all of the bits to be protected of at least one an earlier message are also used for the input of the MAC computation for the integrity protection of the second message. This can be done by concatenation (e.g. prepending or appending) of the bits to be protected from the first message to the bits to be protected of the second message and using the result as the input for the MAC computation. The resulting MAC is truncated to N bits to produce the truncated MAC for the second message. For example N could be a byte, i.e. 8 bits. After the second message has been sent, an attacker has a probability of 1 in $2^{(2*N)}$ to forge the former message and a probability of 1 in $2^N$ to forge the latter message. Hence, when the method according to the invention is used, the MAC protection for a latter message increases the confidence level in an earlier message. When combining a predetermined number of messages (M), the probability that an attacker forges the earliest message is decreased to 1 in $2^{(M*N)}$.

One could consider a system where the first M−1 messages are sent without any MAC protection, and then message number M is sent with a normal length MAC protection (i.e. the length would be M*N) computed over the previous M messages and this message number M. There are two advantages of the claimed method over this system. Firstly that the earlier messages already have significant integrity protection which is relevant in systems where trust in the data must be present and the use of the data is time sensitive. Secondly, all messages have the same size truncated MAC. Having fixed message length is advantageous for many systems.

Further preferred embodiments of the devices and methods according to the invention are given in the appended dependent claims, disclosure of which is incorporated herein by reference.

In an embodiment of the invention, the transmitter (e.g. the IoT device) adds a truncated MAC to the first message it sends without relying on previous message. Advantageously, such a first message may be tagged with a specific identifier to allow the receiver to know that the MAC must be computed over this single message.

In an embodiment of the invention, the number of messages to include in the integrity protection of a new message is defined. This can be done by adding this number to the message (and as part of the message to be integrity protected), so e.g. 0 for the first message to send ("use 0 previously sent messages for the computation of the truncated MAC for this message"). The value can also be predetermined or specified in a standard.

In a further embodiment of the invention, in order to save message bitlength, one can have just one bit indicating whether this is the first message for the integrity protection, or that all previously sent messages up to and including the first one with the indication that it is the first one have to be included in the computation of the truncated MAC for the present message.

It is noted that a hash function with strong encryption properties needs to mix all of the input bits such that the probability a one bit flipping for any change in input bits is 0.5 and that the flipping of any of any output bit is uncorrelated with the flipping of any of the others. Consequently if the desired protection strength is N-bit integrity protection (i.e. guess probability of $2^{(-N)}$ by using N/L shorter hashes, one needs the input mixing properties of the large hash. For example, in SHA 256, the message is broken up in 512 bit chunks. A bit processing algorithm is applied 64 times (the 'rounds') to get an output for the chunk value. Internally, a state of 2048 bits is used in each round. The outputs of the different chunks are combined to compute the hash over the total message. The combining is a simple exor, so here one can reduce the number of computations a bit to only compute the first 8 bits of the end result. Hence by selecting or generating predetermined bits from a message authentication code (MAC) computed over a concatenation of a predetermined part of the message with at least one predetermined part of a previously transmitted message it is means that all needed computations according a respective algorithm are performed in order to obtain the desired bit, independent of the final operations needed to compute the non-used bits.

With respect to the input from the message into the authentication method, either the complete message or predetermined bits thereof (e.g. excluding header bits which may have a known structure/value) shall be used.

Somehow, the number of messages to include in the integrity protection of a new message has to be defined. This can be done by adding this number to the message (and as part of the message to be integrity protected), so e.g. 0 for the first message to send ("use 0 previously sent messages for the computation of the truncated MAC for this message"). The value can also be specified in a standard. In order to save space, one can have just one bit indicating whether this is the first message for the integrity protection or that all previously sent messages up to and including the first one with the indication that it is the first one have to be included in the computation of the truncated MAC for the present message.

In this application, the term message indicates any collection of bits that are sent from one party to one (unicast) or many (multicast, broadcast) receivers, at any level in a communication stack. An example of a lower level message may be a PHY layer packet, or a MAC packet (Media Access Control; due to the fact that MAC may both mean Media Access Control and Message Authentication Code, some specifications use the term Message Integrity Code instead of Message Authentication Code) or a MAC frame, in which cases one can have link-security. An example of a higher level message may be an IP-packet, a UDP packet, a TCP-IP packet, an IPsec packet, etc., in which cases the security is between sender and receivers, which security may extend over several links. Other examples of messages are MPEG Transport Stream packets, MPEG Program Stream packets, Elementary Stream packets that are multiplexed in the payload of MPEG TS or MPEG PS packets, etc. Applications can also define their own messages, where the security is typically end-to-end.

A message (or packet) usually has a header and a payload. The payload is the content or information that gets transferred from the sender to the receiver(s). The header may contain a source address of the sender. The header may contain one or more destination addresses of the intended receiver(s). The header may indicate the length of the payload. The header may indicate security measures, e.g. whether or not the payload is encrypted and/or the payload is cryptographically integrity protected. Usually, the payload gets appended by a CRC, but this is not a cryptographically protected value. A CRC is usually used to determine transmission errors quickly and ask for retransmission in case of errors.

The payload of a message (or packet) may also be appended by a Message Authenticating Code (MAC), or a Message Integrity Code. The creation of both a MAC and a MIC requires the knowledge of a secret key, so MACs and MICs cannot be forged easily. Usually but not always, the header of a message or packet indicates the presence of a MAC or MIC, what its size is, which cryptographic algorithm is used, an indication of the key to use, etc.

A typical way to use the invention is the following. Please note that it is simplest to use the invention for a message type for which already some form of cryptographic protection has been specified, but this is not required for being able to use the invention for a particular message type.

A previously reserved bit in the message (or packet) header or a previously unused value or unused bit in the field in the message header to indicate security algorithms is used to indicate that the invention is used. Another previously unused bit or bits in the message header are used for the message number bit pattern (explained below).

A specification may specify that in case the security indication indicates that the invention is used, which bit or bits are used for the message number bit pattern, how large the truncated MAC is and where it is located in the entire message and which specific algorithm is used for the truncated MAC computation. Any or all of these aspects may be indicated in the security indication itself, e.g. the truncated MAC size or the algorithm used for the computation of the truncated MAC. The may also have been made known by higher layers in the communication system.

When computing the truncated MAC or MIC over several messages, these should all be preferably from the same sender to the same receiver(s).

A typical way in which the invention may be used with the before mentioned indication that the invention is used in a message is the following. In addition to the message number bit pattern, an embodiment may also use an indication whether or not the MAC in the message is truncated or not. This indication may be called the MAC truncation bit pattern, which is a 1-bit pattern in this example case. This has the advantage that messages with a truncated MAC a with a normal size MAC can be used in the same communication system.

In addition to the indication that a message uses a truncated MAC or not, or as an alternative to a 1-bit indication that a message uses a truncated MAC or not, a MAC truncation bit pattern can be used that indicates to how many bits the MAC or MIC was truncated, e.g. to 8 bits. The MAC truncation bit pattern may also show how many bits were taken from the normal MAC or MIC, so an indication of 0 would mean that the normal, non-truncated MAC or MIC is used. The use of a multi-bit MAC truncation bit pattern has the advantage of flexibility in the decrease of the message size.

In a simple embodiment, a 1-bit MAC truncation bit pattern 'T' bit and a 1-bit message number bit pattern 'N' bit is used in the header of each message. The MAC or MIC of the message is truncated to e.g. 8 bits when the 'T' bit, equals 1. The full MAC or MIC is used when the 'T' bit equals 0. The value of 0 is set to the 'N' bit when the message is a 'first message', and the value of 1 is set to the 'N' bit when the message is a 'next message' i.e. not a 'first message'. Messages that use the 'T' and 'N' bit combinations of (1,0) and (1,1) have a reduced overhead. A message that uses the 'T' and 'N' bit combination of (0,0) uses the full MAC or MIC and does not use previous messages for the MAC or MIC, so (0,0) effectively is the known integrity protection. The advantage of having this combination is that the message integrity protection of the invention can be used flexibly in a system that also uses the known integrity protection. A series of messages with a 'T' and 'N' bit combination of (1,1) can be ended with a message with a T' and 'N' bit combination of (0,1), so the last messages of the (1,1) series that are used in the computation of the MAC or MIC of the message with the (0,1) combination now instantly obtain the full MAC integrity protection. This is advantageous when the transmitter wants to switch over to the legacy integrity protection using the combination (0,0) and yet providung the full integrity protection of all messages.

BRIEF DESCRIPTION OF THE DRAWINGS

These and other aspects of the invention will be apparent from and elucidated further with reference to the embodiments described by way of example in the following description and with reference to the accompanying drawings.

The figures are purely diagrammatic and not drawn to scale. In the Figures, elements which correspond to elements already described may have the same reference numerals.

DETAILED DESCRIPTION OF THE EMBODIMENTS

Figure 1:
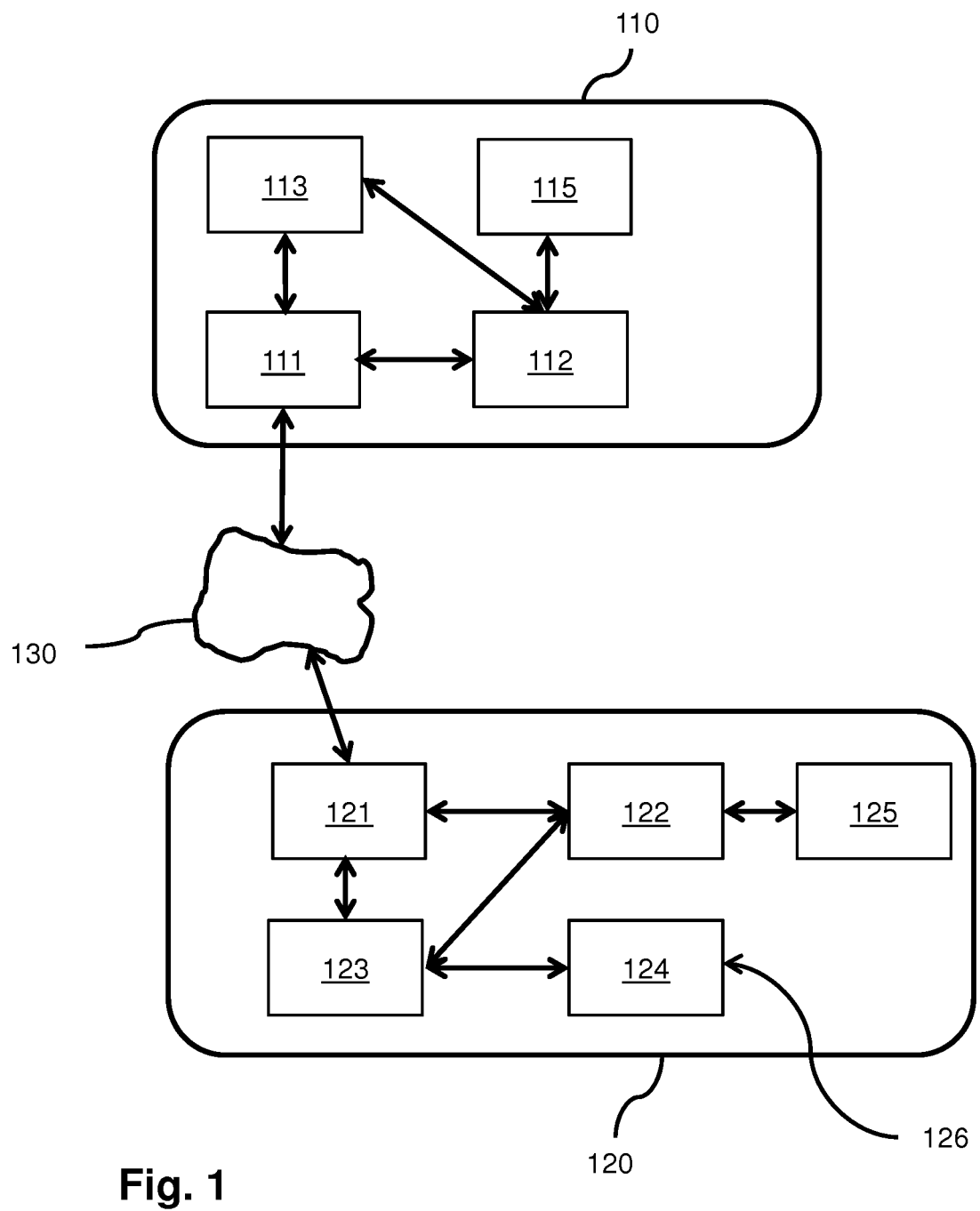
FIG. 1 shows a communication system having a transmitter and a receiver in a network for sending and receiving messages and associated message authentication codes and for authenticating the received messages according to an embodiment of the invention.

FIG. 1 shows two devices for communication in a network, one adapted for sending messages using the truncated MAC and the other adapted for receiving messages with the truncated MAC.

In a communication system 100 a network provides communication 130 between two devices 110 and 120 according to a communication protocol.

The communication protocol defines messages on a link between the two devices, or between two applications running on the processors 113, 123 of the devices, or between an application running on processor 123 and a processor (not shown in the figure) to which device 110 forwards the messages from device 120 to. The messages contain data that does not need integrity protection, data that does need integrity protection and a short message authentication code (MAC).

The device 120 has a transceiver 121 arranged for transceiving according to the communication protocol, a truncated MAC generator 122 for generating the truncated MAC codes for integrity protection of the messages and a processor 123 arranged to manage message transfer on the link to device 110.

The processor 123 is further arranged to provide the truncated MAC generator 122 with the correct key to compute the truncated MAC with and is further arranged to obtain message content from message content generator 124, which may e.g. be a sensor measuring a physical property 126.

The truncated MAC generator 122 is further arranged to store previously sent messages in message memory 125 and retrieve previously sent messages from message memory 125 to use for the computation of truncated MACs.

The transceiver 121 obtains a truncated MAC from truncated MAC generator 122 for every message that it sends.

Likewise, device 110 has a transceiver 111 arranged for transceiving according to the communication protocol, a truncated MAC generator 112 for generating the truncated MAC codes for checking the integrity protection of the received messages and a processor 113 arranged to manage message transfer on the link to device 110.

The processor 113 is further arranged to provide the truncated MAC generator 112 with the correct key to compute the truncated MAC with and may further be arranged to forward received messages to another device (not shown) or other application (not shown), where the messages are further processed, their contents displayed, etc.

The truncated MAC generator 112 is further arranged to store previously received messages in message memory 115 and retrieve previously received messages from message memory 115 to use for the computation of truncated MACs.

The transceiver 111 obtains a truncated MAC from truncated MAC generator 112 for every message that it receives, so it can perform the integrity protection provided by the truncated MAC, by comparing the truncated MAC obtained from truncated MAC from truncated MAC generator 112 with the one in a received message. Alternatively, the processor 113 or the truncated MAC generator 112 performs this comparison.

In practice, the communication protocol may be any wireless communication protocol, such as any cellular network protocol defined by e.g. 3GPP, it may be Wi-Fi, Bluetooth, ZigBee, any IoT wireless communication protocol, e.g. LoRa, Narrowband IoT (NB-IoT), LTE Cat 1, LTE Cat 0, LTE Cat M1 (eMTC), LTE Cat NB1, etc. The communication protocol may also be any wired communication protocol, e.g. Ethernet.

In practice, Device 110 may be a cellular network base station (an eNodeB, E-UTRAN Node B, also known as Evolved Node B), a Wi-Fi Access Point (AP) a Wi-Fi Peer-to-Peer device, a Bluetooth device, a ZigBee device, an IoT device using an IoT wireless communication protocol, etc. Device 120 may be any device that sends messages to device 110, such as an IoT device that uses any of the before mentioned communication protocols. Of course, device 120 may also be any of the devices mentioned for device 110 and device 110 may then be any of the devices mentioned for device 120, where device 120 sends messages to device 110.

In an embodiment device 120 creates a first message for sending to device 110. The fact that this is the first message can be indicated in the message by a message number bit pattern. This message number bit pattern may be part of the message header, but it may also be part of the message body. The bit pattern can be just 1 bit with e.g. a '0' meaning that it is the first message and a '1' meaning that it is a next message. A next message is any message after the first message that is not a first message.

The message number bit pattern can also indicate a number that indicates how many previously sent messages have been used in the computation of the truncated MAC for this message. E.g. if the truncated MAC length is 8 bit, a bit pattern of 5 bits can indicate that at maximum, 31 of the previously sent messages have been included in the computation of the truncated MAC for the current message. With these numbers, the effective MAC size for the first message is 32*8=256 bit after 31 more messages have been sent after the first message, which is equal the protection strength of HMAC-SHA256. Preferably, the message number bit pattern is included in the message bits to be integrity protected.

The processor 123 creates the first message based on e.g. content from message content generator 124. The processor 123 also creates the message number bit pattern indicating the first message as described above and sends this to the transceiver 121. Alternatively, transceiver 121 creates the message number bit pattern itself.

The truncated MAC generator 122 collects all of the bits of the first message to be integrity protected and uses these as the input for a MAC algorithm, e.g. HMAC-SHA256. The complete first message or at least the bits of the first message to be used in the truncated MAC computation for next messages are stored in the message memory 125, which bits may or may not include the truncated MAC that the truncated MAC generator computed for this message. The key to be used for the MAC generation is provided to truncated MAC generator 122 by processor 123. Key distribution is well-know and can e.g. be done during factory installation or can be sent to device 120 using secure messages over the communication 130.

The truncated MAC generator 122 truncates the computed MAC to a truncated MAC, by taking any N bits from the MAC, e.g. the first N bits, where N is smaller than the MAC size. E.g. N can be 8 bit, while the MAC size is 256 bit for HMAC-SHA256.

The truncated MAC generator 122 provides the transceiver 121 with the truncated MAC, so the transceiver can include the truncated MAC in the message to be sent. After inclusion of the truncated MAC in the message, the transceiver 121 sends the message to device 110 using communication 130.

In case a next message is to be sent, the processor 123 creates a new message based on e.g. content from message content generator 124 and sends it to transceiver 121 for transmission over the communication network. The processor 123 also creates the message number bit pattern indicating the next message as described above and sends this to the transceiver 121. Alternatively, transceiver 121 creates the message number bit pattern itself. The truncated MAC generator 122 also needs to know this bit pattern.

For the next message, the truncated MAC generator 122 not only collects all of the bits of the next message to be integrity protected, but also the bits of a number of previously sent messages that needed to be integrity protected, which bits may or may not include the truncated MACs of the previously sent messages. All of these bits are now used as the input for a MAC algorithm, e.g. HMAC-SHA256. This can be done by simply appending these bits after one another. Similarly to what it did for the first message, the truncated MAC generator 122 stores the complete next message or at least the bits of the next message to be integrity protected in the message memory 125, which bits may or may not include the truncated MAC.

The amount of previously stored messages to be used in the computation of the truncated MAC can be indicated in the message number bit pattern. The amount of bits for the size of the message number bit pattern is preferably larger than 1 in this case, but just one bit will also work and in which case just the last sent message is included in the truncated MAC computation.

Alternatively, the amount of previously stored messages to be used in the computation of the truncated MAC can be all previously sent messages up to and including the first message with a maximum of a certain number of previously sent messages. This maximum can be specified in a standard, such as an Bluetooth SIG (https://www.bluetooth.com/), IEEE (https://www.ieee.org/), Wi-Fi Alliance (https://www.wi-fi.org/) or 3GPP (http://www.3gpp.org/). E.g. if this maximum is 31 and the next message is the second message to be sent after the first message, the previously sent two messages (the first one and the first message after the first one) are included in the truncated MAC computation. E.g. if this maximum is 31 and the next message is the 32nd message to be sent after the first message, the previously sent 31 messages are included in the truncated MAC computation, so all messages after the first message. The message memory 125 need not store more than this maximum amount of messages. The maximum number of messages to be used may also be undefined, in which case simply all previously sent messages up to and including the first message are used for the truncated MAC computation. In this case, device 120 should decide every now and then to send a message as a first message so the amount of input to the MAC computation and the amount to store in message memory 125 does not get too large. In all these cases, the message number bit pattern can be just one bit, as explained above.

Deciding to send a message as a first message may e.g. be done as a reaction on a message from device 110. Device 110 may want to do that if it has lost or not received or received in error one or more previously sent messages.

The rest of the procedure for a next message is similar to the procedure for the first message. The truncated MAC generator 122 truncates the computed MAC to a truncated MAC, by taking any N bits from the MAC, e.g. the first N bits, where N is smaller than the MAC size. E.g. N can be 8 bit, while the MAC size is 256 for HMAC-SHA256. The truncated MAC generator 122 provides the transceiver 121 with the truncated MAC, so the transceiver can include the truncated MAC in the next message to be sent. After inclusion of the truncated MAC in the message, the transceiver 121 sends the message to device 110 using communication 130.

In an embodiment device 110 receives a message from device 110 in transceiver 111. As can be appreciated by persons skilled in the art, the actions of device 110 are rather similar to that of device 120. E.g. if device 110 uses an HMAC-SHA256 truncated to 8 bit as truncated MAC, so does device 120. Both devices need to use the same maximum for the number of previously sent messages to be included in the computation of the truncated MAC.

Transceiver 111 provides at least the bits to be integrity protected from this message, the truncated MAC from the received message, as well as the message number bit pattern in the received message to truncated MAC generator 112. The truncated MAC generator 112 stores the complete received message or at least the bits of the received message to be used in the truncated MAC computation for later messages in the message memory 115.

If the message number bit pattern indicates that it is a first message, the truncated MAC generator 112 uses all of the bits of the first message to be integrity protected as the input for a MAC algorithm, e.g. HMAC-SHA256.

If the message number bit pattern indicates that the received message is a next message, the truncated MAC generator 112 not only collects all of the bits of the received message to be integrity protected, but also the bits of a number of previously received messages that needed to be integrity protected, as stored in message memory 115, and which stored bits may or may not include the truncated MACs of the previously sent messages. All of these bits are now used as the input for a MAC algorithm, e.g. HMAC-SHA256. This can be done by simply appending these bits after one another.

As explained above, the number of previously received messages to use in the truncated MAC computation by truncated MAC generator 112 may be indicated in the message number bit pattern, it may be all previously received messages up to and including a message indicated as first message with a maximum of a certain number of previously sent messages, with this maximum as described above. Message memory 115 need not store more messages than this maximum.

The key to be used for the MAC generation is provided to truncated MAC generator 112 by processor 113. Key distribution is well-know and can be done by factory installation or can be sent to device 110 using secure messages over any communication network (not shown).

The truncated MAC generator 112 truncates the computed MAC to a truncated MAC, by taking any N bits from the MAC, e.g. the first N bits, where N is smaller than the MAC size. E.g. N can be 8 bit, while the MAC size is 256 for HMAC-SHA256.

The truncated MAC generator 112 compares the computed truncated MAC with the truncated MAC from the received message. If these two values are the same, the received message as well as all previously received messages that were used in the truncated MAC computation are indicated as OK. This indication may include per received message the amount of truncated MACs that have been found correct for that message, which serves as a measure of trustworthiness. Other measures of trustworthiness, e.g. the probability of the message being fake where the attacker used a random truncated MAC, are also possible. If these two values are not the same, the received message as well as all previously received messages that were used in the truncated MAC computation are indicated for ever as faulty, which overrides any previously set 'OK' status.

Alternatively, the transceiver 111 or processor 113 may perform the truncated MAC comparison and the handling of the consequences.

Figure 2:
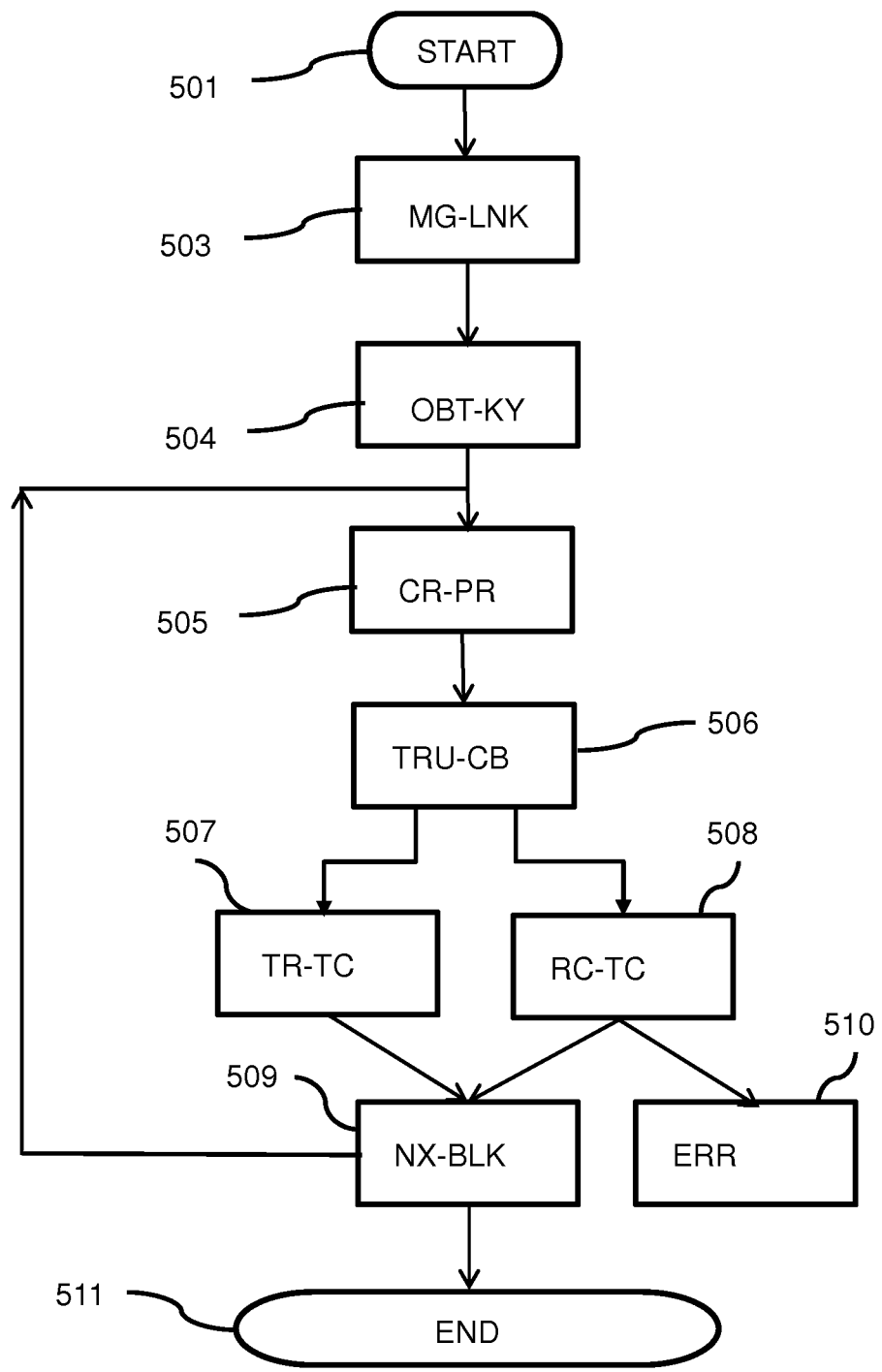
FIG. 2 shows a method of transmitting messages and associated message authentication codes according to an embodiment of the invention.

FIG. 2 shows a method of transmitting messages and associated message authentication codes according to an embodiment of the invention. The method start with a link managements step 503, which related the establishing a connection between the transmitter and the receiver. In step 504, a key or other secret information needed for the authentication method is either exchanged or determined by each of the transmitter and receiver. In step 505 the necessary operations for computing the message authentication code are performed. In step 506 the trucation of the message authentication code as previously described in performed. In step 507 the truncated MAC code is appende to the message for transmission and the method moves to the next block/message.

Figure 3:
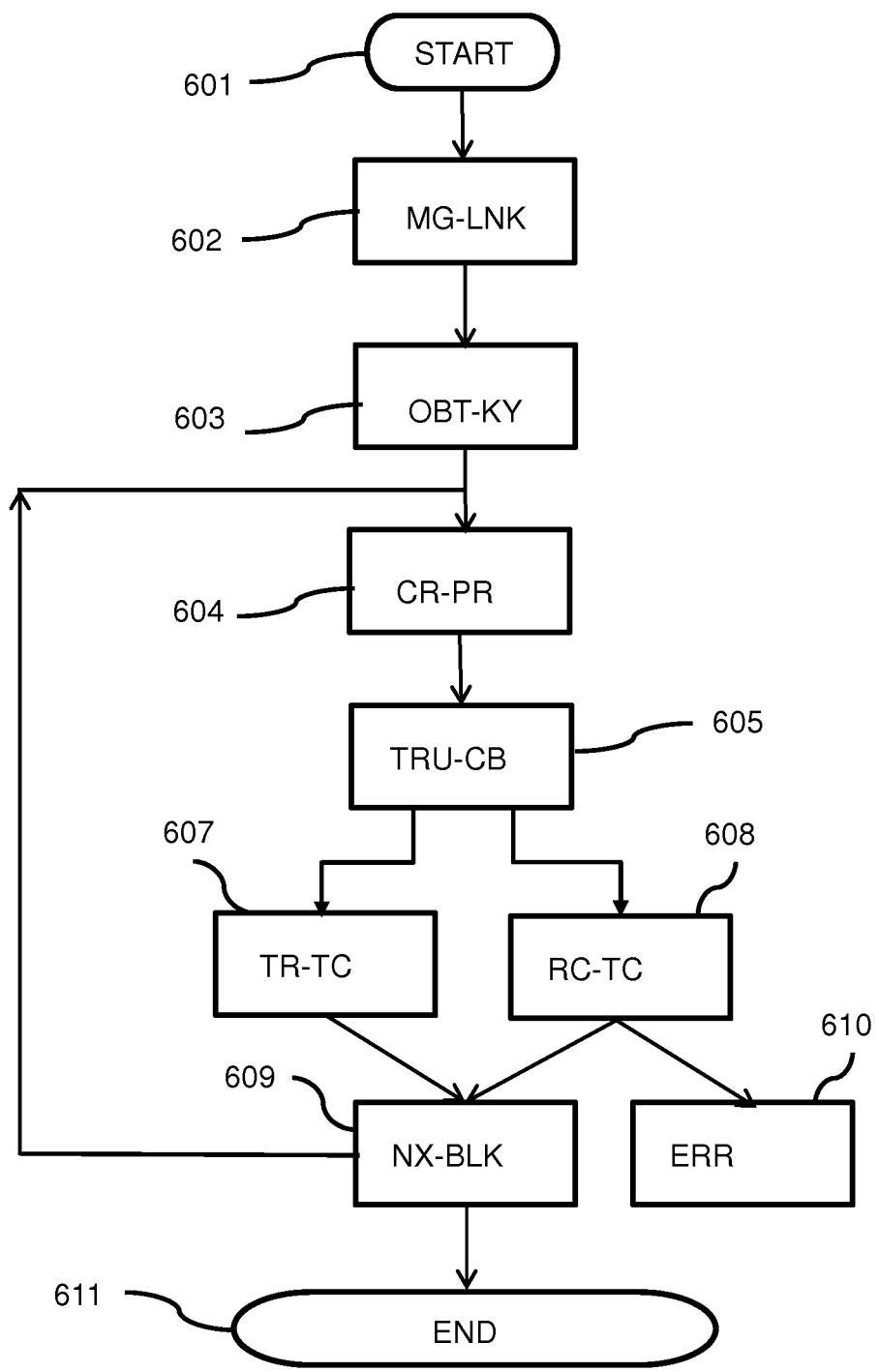
FIG. 3 shows a method of receiving messages and associated message authentication codes and for authenticating the received messages according to an embodiment of the invention.

FIG. 3 shows a method of receiving messages and associated message authentication codes and for authenticating the received messages according to an embodiment of the invention. The method start with a link managements step 503, which related the establishing a connection between the transmitter and the receiver. In step 504, a key or other secret information needed for the authentication method is either exchanged or determined by each of the transmitter and receiver. In step 505 the necessary operations for computing the message authentication code are performed. In step 506 the trucation of the message authentication code as previously described in performed. In steps 606 and 607 the comparison between the computed truncated code and the received truncated code is made. If the two are identicatal both the present and previous messages are authenticated and the method moves to the next block 609. If the two are not identication, an error message 610 is generated and the message and the previous message are not authentication While in the above the various embodiments of the invention were described in term of how to protect the message, in the following we will discusss the details of how the embodiments of the invention could be used in various data transmission standards including e.g. 3GPP, WiFi and Bluetooth.

With respect to Wi-Fi MAC frames, see [802.11], the CTR with CBC-MAC protocol (CCMP, section 12.5.3 in [802.11] is widely used for the protection of Wi-Fi frames including the frames used in 802.11n, 802.11ac, 802.11ax and 802.11ah. The commercial name for 802.11ah is HaLow. As an example, the invention can be used together with CCMP, by using the reserved bits B0-B4 in the 8-octet CCMP header. E.g. B0 could be used that instead of the 8-octet CCMP MIC, a truncated MIC is used according to the invention. The MIC is computed with the same algorithm and key as for CCMP, but with using the contents of previously sent MAC frames from the same source to the same destination as explained below. E.g. bit B1 could be used to indicate that the present frame is the first frame (message) as explained below. E.g. bits B2 and B3 could indicate the length of the truncated MIC, e.g. 1, 2, 3 or 4 octets. Since the original CCMP MIC is 8-16 octets in size, a considerable reduction can be achieved by the invention. It could also be specified in a new version of [802.11] that the truncated MIC is e.g. 1 octet in size. Bits B1 B2 could e.g. also be used as a 2-bit message number bit pattern, which value means 'include N previously sent messages from the same sender to the same receiver(s) as the ones for this message in the computation of the truncated MIC for this message'.

In case a Wi-Fi MAC frame is the first message to use the truncated MIC, a MIC is computed as specified by the CCMP specification in section 12.5.3 in [802.11] and the normal MIC is truncated to e.g. 8 bits and appended after the payload of this Wi-Fi MAC frame. The message number bit pattern is set to indicate that this is a first message.

In case previously sent Wi-Fi MAC packets need to be used in the computation of the truncated MIC, all bits that are used for the computation of the regular MIC of the previous Wi-Fi MAC packets are prepended (or appended) to the bits of the current Wi-Fi MAC packet that are used for the computation of the regular MIC and the regular algorithm of the CCMP MIC computation is used but now with the longer input. The MIC result is truncated to e.g. 8 bit and appended after the payload of the Wi-Fi MAC packet. The message number bit pattern is set to the correct number.

Wi-Fi frames that are used in 802.11ad (WiGig or 60 GHz Wi-Fi, or directional multi-gigabit (DMG), see [802.11]) typically use the GCM protocol (GCMP, section 12.5.5 of [802.11] for their protection. The invention can be used in a manner similar to described above for CCMP, using any of the reserved bits B0-B4 of the GCMP header and a truncated MIC. Since the original GCMP MIC is 16 octets in size, a considerable reduction can be achieved by the invention.

Cellular communication protocols are specified by 3GPP (http://www.3gpp.org/), e.g. the LTE, 4 g and 5 g mobile communication specifications.

When a packet, e.g. an IP-packet, needs to be sent from a mobile base station (eNodeB in 3GPP terminology) to a mobile device (User Equipment UE in 3GPP terminology) or the other way around, it is sent using the packet data convergence protocol (PDCP), which protocol performs packet header compression, ciphering and integrity protection. This protocol uses PDCP packets with a PDCP header and payload for the transport of packets with their optionally compressed headers. PDCP supports the transport of among others the RTP/UDP/IP, UDP/IP, ESP/IP, IP, TCP/IP, RTP/UDP/IP, ESP/IP packets. Note that not only the internet access of mobile phones makes use of the PDCP and PDCP packets, but also protocols defined by 3GPP for IoT purposes, such as Narrowband IoT (NB-IoT) categories NB1 and NB2, and LTE-M categories CAT-M1 and CAT-M2. PDCP is specified in [38.323].

The packet header compression technique can be based on either IP header compression [RFC 2507] or RObust Header Compression (RFC 3095 or more recent [RFC 5795]).

The integrity protection of PDCP packets is configured by upper layers, as specified by [38.331], using an integrity protection method as specified in [33.501].

Similarly as described above, the invention can be used for the integrity protection of PDCP packets. The use of the invention and some general parameters, such as e.g. the algorithm for the truncated MIC and the size of the truncated MIC can be configured by higher layers, similarly to what is already specified for the conventional MIC computation. One or more reserved bits in the PDCP header can be used to carry the message number bit pattern. Section 6.2.2 of [38.323] specifies the PDCP header for Data PDUs (protocol data units). There are at least three reserved bits in octet 1 of the different types of Data PDUs. The difference between them is the size of the PDCP Sequence Number (SN). Control PDUs are not integrity protected in the current 3GPP specification. However, their PDCP Header has four reserved bits (see section 6.2.3 of [38.323], which can be used to indicate the use of the invention and carry the message number bit pattern.

In case a PDCP packet is the first message to use the truncated MIC, a MIC is computed over the bits of the message as specified in section 5.9 of [38.323] and as configured by upper layers, as specified by [38.331] and the normal MIC is truncated to e.g. 8 bits and appended after the payload of this PDCP packet. The message number bit pattern is set to indicate that this is a first message.

In case previously sent PDCP packets need to be used in the computation of the truncated MIC, all bits that are used for the regular computation of the regular MIC of the previous PDCP packets are prepended (or appended) to the bits of the current PDCP packet that are used for the regular computation of the regular MIC and the regular algorithm of the DPCP MIC computation is used but now with the longer input. The MIC result is truncated to e.g. 8 bit and appended after the payload of the PDCP packet. The message number bit pattern is set to the correct number.

The PDCP uses the radio-link control (RLC) for the transfer of PDCP packets. The RLC is responsible for segmentation/concatenation, retransmission handling, duplicate detection, and in-sequence delivery to higher layers. The RLC uses RLC packets with an RLC header and payload. The payload is used to transfer (parts of) PDCP packets. There is currently no cryptographic protection specified for RLC packets. Nevertheless, the invention can be used as described above. Application of the invention for the RLC may imply that a new key needs to be established between sender and receiver(s).

The RLC uses medium-access control (MAC) packets to transfer the RLC packets. MAC packets also have a header and payload, the latter of which is used for the transfer of RLC packets. The medium-access control in 3GPP systems handles multiplexing of logical channels, hybrid-ARQ retransmissions, and uplink and downlink scheduling. There is currently no cryptographic protection specified for MAC packets. Nevertheless, the invention can be used as described above. Application of the invention for the MAC layer may imply that a new key needs to be established between sender and receiver(s).

Bluetooth LE is specified in Specification Volume 6 of [BT v5.0].

Bluetooth LE packets on the link-layer are called protocol data units (PDU). Other Bluetooth variants are similar for what is described here. A Bluetooth (LE) PDU has a 16-bit header, a payload and may have a MIC. A Bluetooth LE PDU is carried in a link layer packet. The latter contains a 32-bit Access Address that specifies an existing link between two specific devices. The same Access Address means a link between the same set of two devices. There are no reserved bits in the PDU header. The PDU header has bits to indicate whether the payload contains a data (Data PDU) or control information (Control PDU). The PDU header has no indication whether or not the payload is encrypted and a MIC is present. Instead, this is indicated by specific Control PDUs. A control PDU packet contains an Opcode (code to indicate an operation), such as 'start encryption' (LL_START_ENC_REQ) and 'pause encryption' (LL_PAUSE_ENC_REQ). The 'start encryption' command starts both encryption and integrity protection using the MIC, since both are always used together or not at all. The invention can be used in BLE, by adding a few new Opcodes for the Control PDUs, e.g. one or more Opcodes to send the message number bit pattern, an Opcode to signal to start encrypting and using the truncated MIC, which Opcode may also serve to indicate that the next Data PDU with the same Access Address is the first message to use in the computation of the truncated MIC. The regular 'pause encryption' (LL_PAUSE_ENC_REQ) may serve as indication that the next DATA PDUs with the same Access Address are no longer encrypted and do no longer contain a truncated MIC.

In case a Data PDU is the first message to use the truncated MIC, a MIC is computed as specified by the Bluetooth specification and the normal MIC of 32 bit is truncated to e.g. 8 bits and appended after the payload of this Data PDU. This means a reduction of 24 bits of each Data PDU. The message number bit pattern is set to indicate that this is a first message.

In case previously sent DATA PDUs need to be used in the computation of the truncated MIC, all bits that are used for the computation of the regular MIC of the previous messages are prepended (or appended) to the bits of the current message that are used for the computation of the regular MIC and the regular algorithm of the Bluetooth MIC computation (CCM) is used but now with the longer input. The MIC result is truncated to e.g. 8 bit and appended after the payload of the Data PDU. The message number bit pattern is set to the correct number.

The truncated MIC computation can use the same MIC algorithm and the same key as specified in the Bluetooth specification, but of course also other MIC algorithms and other keys can be defined.

Different versions of the Bluetooth specification use the same division in Data PDUs and Control PDUs, but the addressing may be different and the security algorithms may be different. Nevertheless, the invention can be used in a similar way for other Bluetooth versions.

LoRaWAN has been specified in [LoRaWAN]. LoRaWAN is a network protocol which is optimized for battery-powered end-devices that may be either mobile or mounted at a fixed location. LoRaWAN networks typically are laid out in a star-of-stars topology in which gateways relay messages between end-devices and a central Network Server the Network Server routes the packets from each device of the network to the associated Application Server. To secure radio transmissions the LoRaWAN protocol relies on symmetric cryptography using session keys derived from the device's root keys. In the backend the storage of the device's root keys and the associated key derivation operations are insured by a Join Server.

The lowest layer of communication in a LoRaWAN network is the radio PHY layer where the uplink and downlink messages carry a PHY payload. The PHY payload can carry a MAC packet consisting of a MAC header (MHDR), a MAC payload (MACPayload) and a cryptographic. Message Integrity Code (MIC) of 4 octets. One way to apply the invention in LoRaWAN is to use one of the three reserved for future use values of the 2-bit Major field of the MHDR to indicate that the invention is used. If the Major field indicates that the invention is used, this also means that the MHDR is extended with one or more bits for the message number bit pattern as explained below. In addition, the MHDR could be extended with one or two bits indicating the length of the truncated MIC. Alternatively, two of the three unused values of the Major field can be used; one value to indicate that the invention is used and that this MAC packet is a first message and the other value can be used to indicate that the invention is used and that this MAC packet is a next message.

Similar to described above for e.g. Bluetooth, when a MAC packet is indicated as the first message, the MIC can be computed as specified by the LoRaWAN specification using the same key and algorithms. However, instead of appending the regularly computed MIC, the MIC is truncated to e.g. 8 bits and the truncated MIC is appended after the MACPayload.

Similarly to described above for e.g. Bluetooth, if previously sent MAC packets need to be used in the computation of the truncated MIC, all bits that are used for the regular computation of the regular MIC of the previous MAC messages are prepended (or appended) to the bits of the current MAC message that are used for the regular computation of the regular MIC and the regular algorithm of the LoRaWAN MIC computation is used but now with the longer input. The MIC result is truncated to e.g. 8 bit and appended after the MACPayload.

Figure 4A:
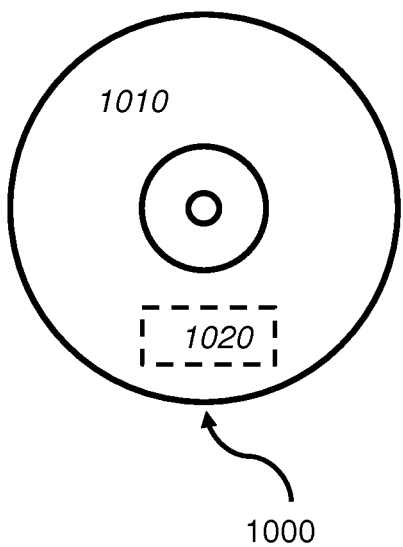
FIG. 4a shows a computer readable medium.

FIG. 4a shows a computer readable medium 1000 having a writable part 1010 comprising a computer program 1020, the computer program 1020 comprising instructions for causing a processor system to perform one or more of the above methods and processes in the system as described with reference to FIGS. 1-3. The computer program 1020 may be embodied on the computer readable medium 1000 as physical marks or by means of magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said methods.

Figure 4B:
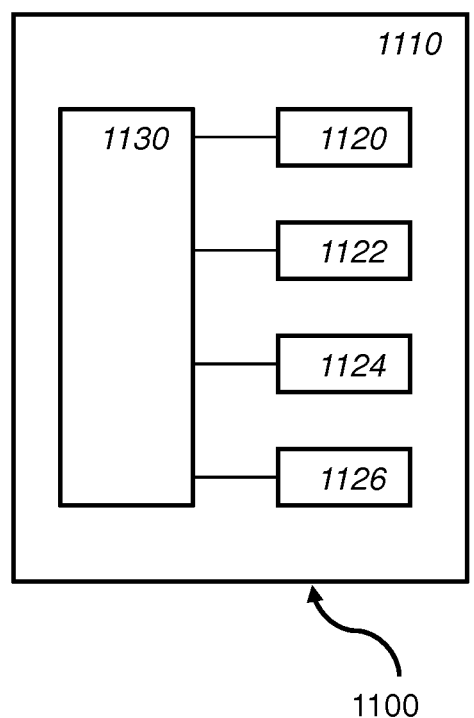
FIG. 4b shows in a schematic representation of a processor system.

FIG. 4b shows in a schematic representation of a processor system 1100 according to an embodiment of the devices or methods as described with reference to FIGS. 1-3. The processor system may comprise a circuit 1110, for example one or more integrated circuits. The architecture of the circuit 1110 is schematically shown in the Figure. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, a transceiver, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for wired and/or wireless communication, using connectors and/or antennas, respectively.

Alternatively, the devices may, in whole or in part, be implemented in programmable logic, e.g., as field-programmable gate array (FPGA). The devices and server may be implemented, in whole or in part, as a so-called application-specific integrated circuit (ASIC), i.e. an integrated circuit (IC) customized for their particular use. For example, the circuits may be implemented in CMOS, e.g., using a hardware description language such as Verilog, VHDL etc.

It will be appreciated that, for clarity, the above description describes embodiments of the invention with reference to different functional units and processors. However, it will be apparent that any suitable distribution of functionality between different functional units or processors may be used without deviating from the invention. For example, functionality illustrated to be performed by separate units, processors or controllers may be performed by the same processor or controllers. Hence, references to specific functional units are only to be seen as references to suitable means for providing the described functionality rather than indicative of a strict logical or physical structure or organization. The invention can be implemented in any suitable form including hardware, software, firmware or any combination of these.

It is noted that in this document the verb 'comprise' does not exclude the presence of elements or steps other than those listed and the word 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. Any reference signs do not limit the scope of the claims. The invention may be implemented by either or both hardware and software. Further, the invention is not limited to the embodiments, and the invention lies in each and every novel feature or combination of features described above or recited in mutually different dependent claims.

In summary, this application relates to

REFERENCED DOCUMENTS

[33.501] 3rd Generation Partnership Project; Technical Specification Group Services and System Aspects; Security architecture and procedures for 5G system (Release 15); 3GPP TS 33.501 V15.2.0 (2018-09); http://www.3gpp.org/ftp//Specs/archive/33 series/33.501/33501-f20.zip

[38.323] 3rd Generation Partnership Project; Technical Specification Group Radio Access Network; NR; Packet Data Convergence Protocol (PDCP) specification (Release 15); 3GPP TS 38.323 V15.3.0 (2018-09), http://www.3gpp.org/ftp//Specs/archive/38 series/38.323/383-23430.zip

[38.331] 3rd Generation Partnership Project; Technical Specification Group Radio Access Network; NR; Radio Resource Control (RRC) protocol specification (Release 15); 3GPP TS 38.331 V15.3.0 (2018-09), http://www.3gpp.org/ftp//Specs/archive/38 series/38.331/38331430.zip

[802.11] IEEE Computer Society, "IEEE Standard for Information Technology Telecommunications and Information Exchange Between Systems Local and Metropolitan Area Networks Specific requirements Part 11: Wireless LAN Medium Access Control (MAC) and Physical Layer (PHY) Specifications," (IEEE Std. 802.11-2016), December 2016 [BT v5.0] Bluetooth Core Specification, v5.0, https://www.bluetooth.org/DocMan/handlers/Download-Doc.ashx?doc id=421043& ga=2.98 314335.154343-4637.1541687761-711838721.1541687761.

[LoRaWAN] LoRaWAN™ 1.1 Specification, authored by the LoRa Alliance Technical Committee, https://lora-alliance.org/resource-hub/lorawantm-specification-v11

[RFC 2507] "IP Header Compression", February 1999, https://datatracker.ietf.org/doc/rfc2507/

[RFC 2104] "HMAC: Keyed-Hashing for Message Authentication", February 1997, https://datatracker.ietf.org/doc/rfc2104/

[RFC 4868] "Using HMAC-SHA-256, HMAC-SHA-384, and HMAC-SHA-512 with IPsec", May 2007, https://datatracker.ietf.org/doc/rfc4868/

[RFC 5795] "The RObust Header Compression (ROHC) Framework", March 2010, https://datatracker.ietf.org/doc/rfc5795/

The invention claimed is:

1. A method of authenticating messages exchanged over a network between a transmitter and a receiver, the method comprising:
   transmitting a message at a transmitter side;
   generating a truncated message authentication code (MAC) by selecting or generating predetermined bits from a MAC computed over a concatenation of a predetermined part of the message with at least one predetermined part of a previously transmitted message;
   wherein a bitlength of truncated MAC is smaller than a bitlength of the message authentication code;
   appending the truncated MAC to the message for transmission;
   authenticating a message at a receiver side;
   receiving a previously transmitted message, the message and the truncated MAC code;
   generating an expected truncated MAC by selecting or generating predetermined bits from a MAC computed over a concatenation of a predetermined part of the message with at least one predetermined part of a previously transmitted message, and
   authenticating the message and the previously transmitted message if the truncated MAC as received is identical to the expected truncated MAC, and
   not authenticating the message and the previously transmitted message if the truncated MAC as received is not identical to the expected truncated MAC, overriding an authentication of the previously transmitted message.

2. The method of claim 1, wherein for a first transmitted message, the MAC is computed over a predetermined part of the first message without concatenation with at least one predetermined part of a previously transmitted message.

3. The method of claim 2, wherein the MAC is computed either
   over a concatenation of a predetermined part of the message with a sequence of second predetermined number of parts of previously transmitted messages; or
   over a concatenation of a predetermined part of the message with a sequence of predetermined parts of each preceding messages starting from the first transmitted message,
   depending on whichever sequence is shorter.

4. A transmitter for transmitting short messages and corresponding message authentication codes over a network, the transmitter comprising:
   an antenna and a transceiver for transmitting a message;
   a processor coupled to the antenna and the transceiver for controlling transmission and generation of a message authentication code (MAC);
   wherein the processor is configured to perform the methods according to claim 3.

5. The method of claim 2, wherein the message is provided with at least one of:
   a first identifier identifying that the MAC is computed over a predetermined part of the first message without concatenation with at least one predetermined part of a previously transmitted message;
   a second identifier identifying that the MAC is computed over a concatenation of a predetermined part of the message with at least one predetermined part of a previously transmitted message.

6. The method of claim 5, wherein at least one of the first identifier or second identifier has a bitlength of 1 bit.

7. The method of claim 6, wherein at least one of the first identifier or second identifier is provided in either a packet header or concatenated with the truncated MAC.

8. The method of claim 1, wherein the message is provided with at least one of:
   a third identifier identifying that the MAC is truncated;
   a fourth identifier identifying that the MAC is truncated to n bits.

9. The method of claim 1, wherein the message is provided with at least one of
   a third identifier identifying that the MAC is truncated;
   a fourth identifier identifying that the MAC is not truncated.

10. A method of transmitting messages and authentication codes over a network by a transmitter, the method comprising:
- generating a truncated message authentication code (MAC) by selecting or generating predetermined bits from a MAC computed over a concatenation of a predetermined part of the message with at least one predetermined part of a previously transmitted message;
- wherein a bitlength of the truncated MAC is smaller than a bitlength of the MAC; and
- appending the truncated MAC to the message for transmission.

11. A method of authenticating messages received by a receiver over a network, the messages comprising a truncated message authentication code (MAC) computed by selecting or generating predetermined bits from a MAC computed over a concatenation of a predetermined part of the message with at least one predetermined part of a previously transmitted message, wherein a bitlength of truncated MAC is smaller than a bitlength of the MAC, the method comprising:
- receiving a previously transmitted message, the message, and the truncated MAC,
- generating an expected truncated MAC by selecting or generating predetermined bits from a MAC computed over a concatenation of a predetermined part of the message with at least one predetermined part of a previously transmitted message;
- authenticating the message and the previously transmitted message if the truncated MAC as received is identical to the expected truncated MAC; and
- not authenticating the message and the previously transmitted message if the truncated MAC as received is not identical to the expected truncated MAC, overriding an authentication of the previously transmitted message.

12. The method of claim 11, wherein for a received first message which is a first transmitted message wherein the (MAC) is computed over a predetermined part of the first message without concatenation with at least one predetermined part of a previously transmitted message,
the method comprising:
- generating an expected truncated MAC by selecting or generating predetermined bits from a MAC computed over the first message without concatenation with at least one predetermined part of a previously transmitted message.

13. The method of claim 11, wherein the message is provided with either:
- a first identifier identifying that the message authentication code (MAC) is computed over a predetermined part of the first message without concatenation with at least one predetermined part of a previously transmitted message; or
- a second identifier identifying that the MAC is computed a concatenation of a predetermined part of the message with at least one predetermined part of a previously transmitted message;
the method comprising:
- using either the first identifier or the second identifier in determining previously transmitted messages to be used in generating an expected truncated MAC.

14. A receiver for receiving short messages and corresponding message authentication codes (MAC) over a network, the receiver comprising:
- an antenna and a transceiver for receiving a message comprising a MAC;
- a processor coupled to the antenna and the transceiver for controlling receiving and generation of a MAC;
    - wherein the processor is configured to perform the methods according to claim 11.

* * * * *